(12) United States Patent
Furuya et al.

(10) Patent No.: US 11,921,030 B2
(45) Date of Patent: Mar. 5, 2024

(54) GAS DETECTION APPARATUS

(71) Applicant: Asahi Kasei Microdevices Corporation, Tokyo (JP)

(72) Inventors: Takaaki Furuya, Tokyo (JP); Keiichiro Kuwata, Tokyo (JP)

(*) Notice: Subject to any disclaimer, the term of this patent is extended or adjusted under 35 U.S.C. 154(b) by 322 days.

(21) Appl. No.: 17/452,617

(22) Filed: Oct. 28, 2021

(65) Prior Publication Data
US 2022/0128449 A1      Apr. 28, 2022

(30) Foreign Application Priority Data

Oct. 28, 2020 (JP) ................................. 2020-180845
Jul. 27, 2021 (JP) ................................. 2021-122620

(51) Int. Cl.
| | |
|---|---|
| *G01N 21/03* | (2006.01) |
| *G01N 21/3504* | (2014.01) |
| *G01N 21/61* | (2006.01) |

(52) U.S. Cl.
CPC ....... *G01N 21/031* (2013.01); *G01N 21/3504* (2013.01); *G01N 21/61* (2013.01)

(58) Field of Classification Search
None
See application file for complete search history.

(56) References Cited

U.S. PATENT DOCUMENTS

| | | |
|---|---|---|
| 2003/0136911 A1 | 7/2003 | Martin |
| 2006/0086903 A1 | 4/2006 | Hopkins et al. |
| | (Continued) | |

FOREIGN PATENT DOCUMENTS

| | | |
|---|---|---|
| CN | 105593666 A | 5/2016 |
| JP | H07159382 A | 6/1995 |
| | (Continued) | |

OTHER PUBLICATIONS

H. C. Manoharan et al., Quantum mirages formed by coherent projection of electronic structure, Nature, Feb. 3, 2000, pp. 512-515, vol. 403.

(Continued)

*Primary Examiner* — Rufus L Phillips
(74) *Attorney, Agent, or Firm* — KENJA IP LAW PC

(57) ABSTRACT

The gas detection apparatus comprises a figure of all or a part of n ellipsoids. When a region inside the ellipsoid $E_i$ and not including the ellipsoid $E_{si}$ is defined as a region $R_i$, the ellipsoid $E_i$ including a light source region of the light emitting part is defined as an ellipsoid $E_s$, the ellipsoid $E_i$ including a light receiving region of the light receiving part is defined as an ellipsoid $E_d$, the region $R_i$ of the ellipsoid $E_s$ is defined as a region $R_{in}$, and the region $R_i$ of the ellipsoid $E_d$ is defined as a region $R_{out}$, 60% or more of the light source region is present in the region $R_{in}$ and 60% or more of the light receiving region is present in the region $R_{out}$.

9 Claims, 10 Drawing Sheets

(56) References Cited

U.S. PATENT DOCUMENTS

| | | |
|---|---|---|
| 2008/0252892 A1 | 10/2008 | Pralle et al. |
| 2015/0219491 A1 | 8/2015 | Lee et al. |
| 2016/0231244 A1 | 8/2016 | Camargo et al. |
| 2016/0252451 A1 | 9/2016 | Kawate |
| 2018/0348121 A1 | 12/2018 | Deliwala |

FOREIGN PATENT DOCUMENTS

| | | |
|---|---|---|
| JP | H09184803 A | 7/1997 |
| JP | 2003532070 A | 10/2003 |
| JP | 2005195477 A | 7/2005 |
| JP | 2005195685 A | 7/2005 |
| JP | 2013002966 A | 1/2013 |
| JP | 2014238307 A | 12/2014 |
| JP | 2017015567 A | 1/2017 |
| JP | 2019020305 A | 2/2019 |
| JP | 2019174354 A | 10/2019 |
| JP | 2019185944 A | 10/2019 |
| KR | 1020080076515 A | 8/2008 |
| WO | 2015056628 A1 | 4/2015 |
| WO | 2015151502 A1 | 10/2015 |

OTHER PUBLICATIONS

Liu Xiu-Zhen et al., Study on Infrared Methane Sensor with Three Ellipsoid Absorption Cavity, Coal Technology, Oct. 2015, pp. 264-266, vol. 34, No. 10.

Ren Li-Jun et al., Research Progress of Non-dispersive Infrared Sensor for Gas Detection, Fenxi Ceshi Xuebao (Journal of Instrumental Analysis), Jul. 2020, pp. 922-928, vol. 39, No. 7.

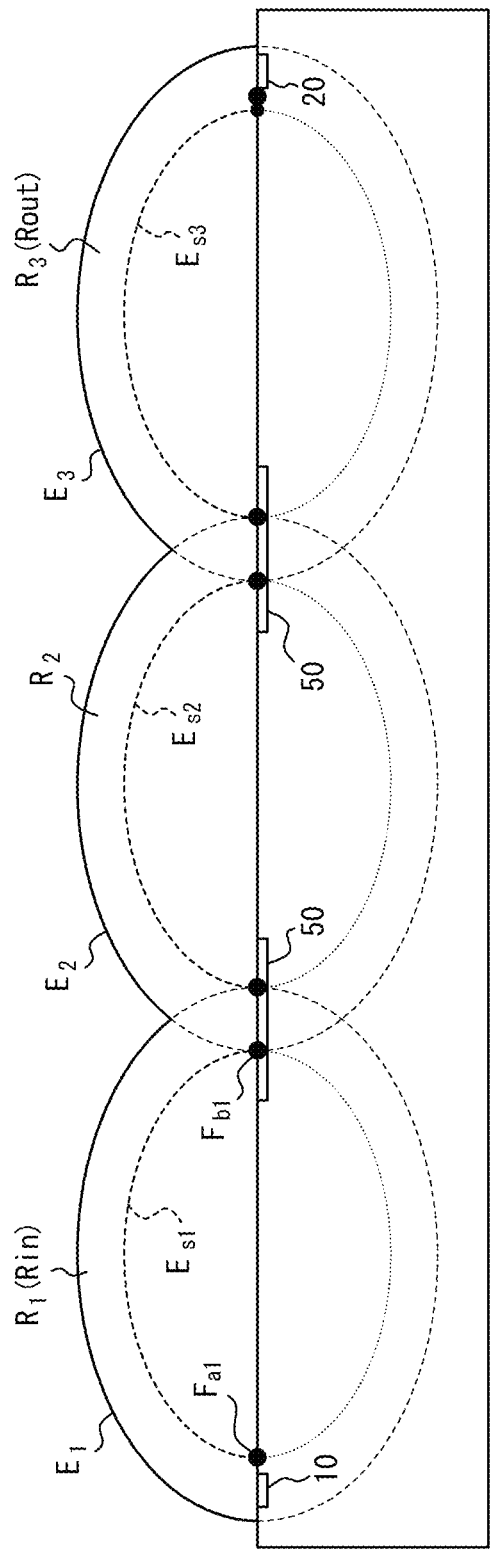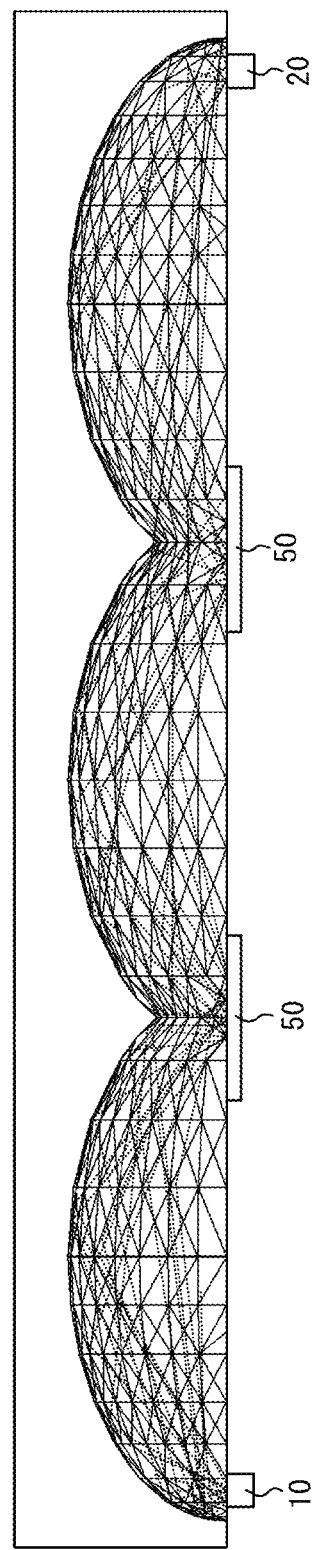

FIG. 7
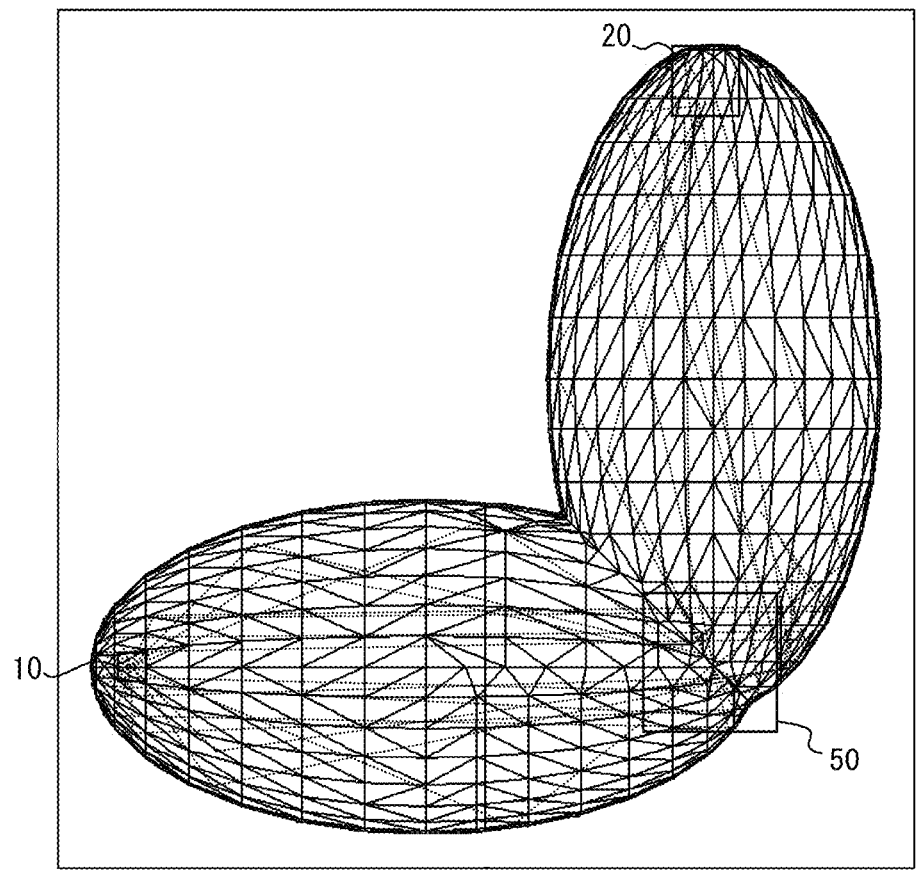
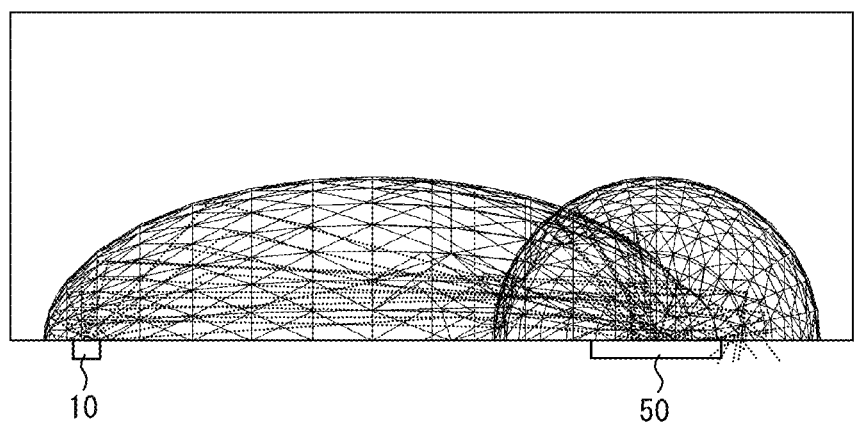

Shape of ellipse $$\frac{x^2}{3^2} + \frac{y^2}{1^2} + \frac{z^2}{2^2} = 1$$

GAS DETECTION APPARATUS

CROSS-REFERENCE TO RELATED APPLICATION

The present application claims priority to and the benefit of Japanese Patent Application No. 2020-180845 filed Oct. 28, 2020 and Japanese Patent Application No. 2021-122620 filed Jul. 27, 2021, the entire contents of which are incorporated herein by reference.

TECHNICAL FIELD

The present disclosure relates to a gas detection apparatus.

BACKGROUND

Gas detection apparatuses for detecting gases have been used in various fields. For example, Patent Literature 1 (PTL 1) discloses an apparatus including a light source for emitting infrared light and a detector for detecting infrared light at a specific wavelength accommodated in a case having an ellipsoidal inner surface (ellipsoidal mirror). A gas to be detected is introduced to the case.

CITATION LIST

Patent Literature

PTL 1: US20180348121 (A1)

SUMMARY

FIGS. 1 and 2 are examples of ray tracing in an optical path design in which the centers of a light emitting part and a light receiving part are disposed at the focal positions of an ellipsoidal mirror, as disclosed in PTL 1. As illustrated in FIG. 1, when the ellipsoidal mirror is large enough for the size of the light emitting part, the light rays emitted from the light emitting part placed at the focal position can be collected at the light receiving part placed at the other focal point. That is, the light emitting part can be approximately regarded as a point light source. Thus, according to the general nature of ellipsoids, the light rays emitted from one focal position will focus on the other focal position.

On the other hand, as illustrated in FIG. 2, when the ellipsoidal mirror is not large enough for the size of the light emitting part, the light rays emitted from the light emitting part are scattered throughout the ellipsoidal mirror, and cannot be collected by the light receiving part of a light receiving element. This is because a physical picture in which the light emitting part approximately behaves as a point light source is broken, and the aberration of the ellipsoidal mirror due to the size of the light emitting part will strongly affect.

With the miniaturization trend of gas detection apparatus in recent years, the ratio of the size of the light emitting part to the size of the ellipsoidal mirror is decreasing.

In light of the aforementioned issue, it would be thus helpful to provide a compact and highly accurate gas detection apparatus using an ellipsoidal mirror.

A gas detection apparatus according to an embodiment comprises: a light emitting part; a light receiving part; and a light guiding part for guiding light from the light emitting part to the light receiving part, wherein
a shape of at least a part of an inner surface of the light guiding part is composed of all or a part of figures of n (n: one or more natural numbers) ellipsoids, and when:
the n ellipsoids are defined as ellipsoids $E_1, E_2, \ldots, E_{(n-1)}$ and $E_n$;
an ellipse having a maximum area in a cross-section of an ellipsoid $E_i$ (i: a natural number satisfying $1 \leq i \leq n$) is defined as an ellipse $Ec_i$;
an ellipsoid that passes through two focal points $F_{ai}$ and $F_{bi}$ of the ellipse $Ec_i$ and has a minimum volume having a scaling relationship with the ellipsoid $E_i$ without being rotated is defined as an ellipsoid $E_{si}$;
a region inside the ellipsoid $E_i$ and not including the ellipsoid $E_{si}$ is defined as a region $R_i$;
the ellipsoid $E_i$ including a light source region of the light emitting part is defined as an ellipsoid $E_s$;
the ellipsoid $E_i$ including a light receiving region of the light receiving part is defined as an ellipsoid $E_d$;
the region $R_i$ of the ellipsoid $E_s$ is defined as a region $R_{in}$; and
the region $R_i$ of the ellipsoid $E_d$ is defined as a region $R_{out}$, 60% or more of the light source region is present in the region $R_{in}$ and 60% or more of the light receiving region is present in the region $R_{out}$.

A gas detection apparatus according to an embodiment comprises: a light emitting part; a light receiving part; and a light guiding part for guiding light from the light emitting part to the light receiving part, wherein
a shape of at least a part of an inner surface of the light guiding part is composed of all or a part of figures of n (n: one or more natural numbers) ellipsoids, and when:
the n ellipsoids are defined as ellipsoids $E_1, E_2, \ldots, E_{(n-1)}$ and $E_n$;
an ellipse having a maximum area in a cross-section of an ellipsoid $E_i$ (i: a natural number satisfying $1 \leq i \leq n$) is defined as an ellipse $Ec_i$;
an ellipsoid that passes through two focal points $F_{ai}$ and $F_{bi}$ of the ellipse $Ec_i$ and has a minimum volume having a scaling relationship with the ellipsoid $E_1$ without being rotated is defined as an ellipsoid $E_{si}$;
a region inside the ellipsoid $E_i$ and not including the ellipsoid $E_{si}$ is defined as a region $R_i$;
the ellipsoid $E_i$ including a light source region of the light emitting part is defined as an ellipsoid $E_s$;
the ellipsoid $E_i$ including a light receiving region of the light receiving part is defined as an ellipsoid $E_d$;
the region $R_i$ of the ellipsoid $E_s$ is defined as a region $R_{in}$;
the region $R_i$ of the ellipsoid $E_d$ is defined as a region $R_{out}$;
the center of gravity of the light source region or a peak point of luminance is defined as a point $G_{in}$; and
the center of gravity of the light receiving region is defined as a point $G_{out}$, the point $G_{in}$ is present in the region $R_{in}$ and the point $G_{out}$ is present in the region $R_{out}$.

According to an embodiment of the present disclosure, a compact and highly accurate gas detection apparatus using an ellipsoidal mirror can be provided.

BRIEF DESCRIPTION OF THE DRAWINGS

In the accompanying drawings:

FIG. 6 is a diagram illustrating a configuration example of the gas detection apparatus according to the present embodiment;

FIG. 7 is a variation of the gas detection apparatus according to the present embodiment;

DETAILED DESCRIPTION

Gas Detection Apparatus of the Present Embodiment

A gas detection apparatus of the present embodiment comprises a light emitting part, a light receiving part, and a light guiding part for guiding light from the light emitting part to the light receiving part.

The shape of at least a part of an inner surface of the light guiding part is composed of all or a part of figures of n (n: one or more natural numbers) spheroids.

The n spheroids are defined as ellipsoids $E_1$, $E_2$, $E_{(n-1)}$ and $E_n$. An ellipsoid that passes through two focal points $F_{ai}$ and $F_{bi}$ of an ellipsoid $E_i$ (i: a natural number satisfying 1≤i≤n), has the same axis of rotational symmetry as that of the ellipsoid $E_i$, and has a similarity shrinking relationship with the ellipsoid $E_i$ is defined as an ellipsoid $E_{si}$. A region inside the ellipsoid $E_i$ and not including the ellipsoid $E_{si}$ is defined as a region $R_i$. The ellipsoid $E_i$ including a light source region of the light emitting part is defined as an ellipsoid $E_s$. The ellipsoid $E_i$ including a light receiving region of the light receiving part is defined as an ellipsoid $E_d$ (when the number of ellipsoids is one, that is, when n=1, $E_s$=$E_d$). A region $R_i$ of the ellipsoid $E_s$ is defined as a region $R_{in}$. A region $R_i$ of the ellipsoid $E_d$ is defined as a region $R_{out}$.

In the gas detection apparatus according to the present embodiment, 60% or more of an area of the light source region is present in the region $R_{in}$ and 60% or more of an area of the light receiving region is present in the region $R_{out}$.

Although the detailed principle will be described later, with this configuration, a compact and highly accurate gas detection apparatus using an ellipsoidal mirror can be provided.

Figure 3:
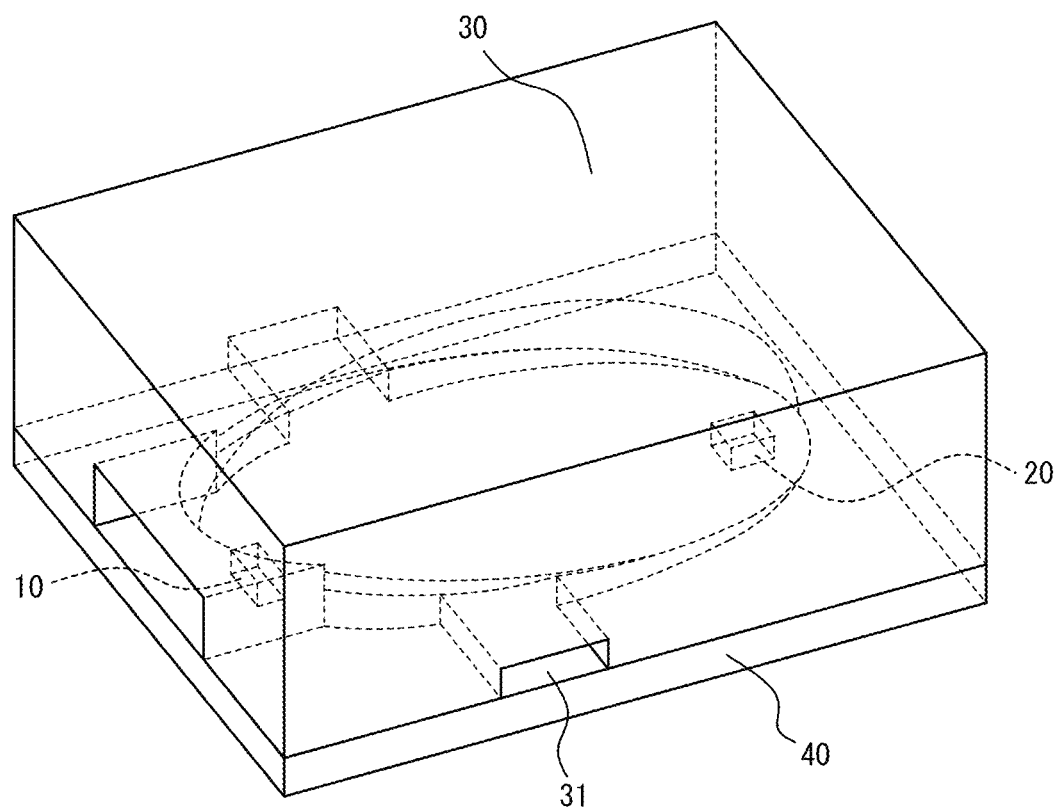
FIG. 3 is a partially transparent perspective view of a gas detection apparatus according to an embodiment.

Example of Specific Configuration of Gas Detection Apparatus of the Present Embodiment FIG. 3 is a partially transparent perspective view of a gas detection apparatus according to an embodiment of the present disclosure. As an example, the gas detection apparatus is a compact apparatus with length, width and height of 7 mm, 5 mm and 3 mm, respectively, and is also referred to as a gas sensor.

In the present embodiment, the gas detection apparatus is a Non Dispersive InfraRed (NDIR) type apparatus that measures the concentration of the gas to be detected based on the infrared rays transmitted through the introduced gas.

The gas to be detected is, for example, carbon dioxide, water vapor, carbon monoxide, nitric oxide, ammonia, sulfur dioxide or alcohol, hydrocarbon gases such as formaldehyde, methane, and propane.

<Architecture (Interrelationship of Components)>

The gas detection apparatus comprises a light emitting part, a light receiving part and a light guiding part. The gas detection apparatus may further comprise a holding part. Further, the gas detection apparatus may comprise an additional controller. The gas detection apparatus according to an embodiment of the present disclosure illustrated in FIG. 3 comprises a light receiving part 20 and a light emitting part 10 held by a holding part 40 and a light guiding part 30 held by the holding part 40. Although not illustrated, a controller for controlling at least one of the light emitting part 10 and the light receiving part 20 may be provided in the holding part 40.

The surfaces of the light emitting part 10 and the light receiving part 20 are facing to the space (detection space) between the inner wall of the light guiding part 30 and the upper surface of the holding part 40. Further, the light guiding part 30 has a gas port 31 that can introduce and withdraw gas into and from the detection space.

The light emitted from the light emitting part 10 is reflected at least once on the inner surface of the light guiding part 30 and reaches the light receiving part 20.

Next, a detailed description of the components of the gas detection apparatus according to the present embodiment will be given.

<Light Emitting Part>

The light emitting part 10 is a component that emits light used for detection of the gas to be detected. The light emitting part 10 is not particularly limited as long as it outputs light that includes a wavelength absorbed by the gas to be detected. In the present embodiment, the light emitted by the light emitting part 10 is infrared rays, but it is not limited thereto.

The light emitting part 10 has a light emitting element 10A. In the present embodiment, although the light emitting element 10A is a light emitting diode (LED), as the other examples, it can be a lamp, a laser (Light Amplification by Stimulated Emission of Radiation), an organic light emitting element or Micro Electro Mechanical Systems (MEMS) heater, etc. Further, the light emitting part 10 may include not only the light emitting element 10A but also a passive element that passively emits light by receiving the light emitted by the light emitting element 10A. Specifically, the passive element is a mirror, an optical filter, a phosphor, an optical image, an optical fiber, an optical waveguide, a lens, or a diffraction grating.

In this embodiment, since the light emitting part 10 has only the light emitting element 10A, the light emitting part 10 and the light emitting element 10A refer to the same thing.

The light emitting part 10 has a light source region. The light source region is a region in which photons of the light emitting element 10A are generated when the light is directly guided from the light emitting element 10A to the light guiding part 30 without passing through the passive element as in the present embodiment. Specifically, for a quantum type light emitting element 10A, it is an active region, and for a thermal light source, it is a high temperature region. For example, in the case of a lamp, it is a filament.

Further, when the light emitting part 10 includes a passive element and the light emitted by the light emitting element 10A is guided to the light guiding part 30 through the passive element, the light source region is an aggregate of the light emitting ends of the passive element. Specifically, when the passive element is a mirror, the light source region is a region that reflects light rays.

Further, when the passive element is an optical filter having a wavelength selection function, the region through which the light rays pass on the surface where the optical filter is in contact with the space may be regarded as the light source region. Further, when the passive element is an optical fiber, an optical waveguide, or a lens, the emission surface through which the light rays pass on the surface in contact with the space may be regarded as the light source region.

Further, when an optical image is formed as the light emitting part 10 by a lens, a mirror, or the like, the formed image may be regarded as a light source region.

Here, the light emitting element 10A is preferably a planar surface light source such as an LED, a MEMS heater, or a Vertical Cavity Surface Emitting Laser (VCSEL).

<Light Receiving Part>

The light receiving part 20 is a component that receives light transmitted through the introduced gas. The light receiving part 20 is not particularly limited as long as it has sensitivity in the bandwidth of light including the wavelength absorbed by the gas to be detected. In the present embodiment, the light received by the light receiving part 20 is infrared rays, but the light is not limited to this.

The light receiving part 20 has a light receiving element 20A. In the present embodiment, the light receiving element 20A is a photodiode, but the other examples may include a phototransistor, a thermopile, a pyroelectric sensor, a bolometer, a photoacoustic detector, or the like. Further, the light receiving part 20 may include not only the light receiving element 20A but also an indirect element that guides light to the light receiving element 20A. Specifically, the indirect elements are mirrors, optical filters, phosphors, lenses, diffraction gratings, optical fibers, and optical waveguides.

In the present embodiment, since the light receiving part 20 has only the light receiving element 20A, the light receiving part 20 and the light receiving element 20A refer to the same thing.

The light receiving part 20 has a light receiving region. The light receiving region is a region in the light receiving element 20A having a function of converting the received light into a signal when the light receiving element 20A directly receives light without passing through an indirect element as in the present embodiment. Specifically, when the light receiving element 20A is a photodiode, the light receiving region is an active layer, and when the light receiving element 20A is a thermopile, it is a thermoelectric converting part.

Further, in the light receiving part 20, when the light receiving element 20A receives light through the indirect element, the light receiving region is a region, in the indirect element, that has an optical function for guiding the received light to the light receiving element 20A, and through which light rays pass. Specifically, when the indirect element is an optical filter having a wavelength selection function, the region through which the light rays pass on the surface of the optical filter in contact with the space may be regarded as the light receiving region. Further, when the indirect element is an optical fiber, an optical waveguide, or a lens, the incident surface through which the light rays pass on the surface in contact with the space may be regarded as the light receiving region. When the indirect element is a mirror, the light receiving region is a region that reflects light rays.

<Light Guiding Part>

The light guiding part 30 is a member that guides the light emitted by the light emitting part 10 to the light receiving part 20, and is an optical system of the gas detection apparatus. The light emitted from the light emitting part 10 is reflected by the light guiding part 30 and reaches the light receiving part 20. In other words, the light guiding part 30 optically connects the light emitting part 10 and the light receiving part 20.

In the present embodiment, the inner surface of the light guiding part 30 is a mirror (reflection surface). The shape of at least a part of the inner surface is a figure of all or a part of a spheroid. The light guiding part 30 may further comprise a flat mirror, a concave mirror or a convex mirror, a lens, and a diffraction grating as an auxiliary.

The material constituting the mirror may be, for example, metal, glass, ceramics, stainless steel, etc., but is not limited to them.

From the viewpoint of improving the detection sensitivity, these mirrors are preferably made of materials having a low light absorption coefficient and a high reflectance. Specifically, resin housings provided with coating of an alloy containing aluminum, gold, or silver, a dielectric, or a laminate of these materials are preferred. Examples of the materials of the resin housing include liquid crystal polymer (LCP), polypropylene (PP), polyether ether ketone (PEEK), polyamide (PA), polyphenylene ether (PPE), polycarbonate (PC), polyphenylene sulfide (PPS), polymethyl methacrylate resin (PMMA), polyarylate resin (PAR), or the like, and hard resins of a mixture of two or more of these. Further, resin housings coated with gold or an alloy layer containing gold are preferred in view of the reliability and degradation over time. Moreover, a laminated film of a dielectric is preferably formed on the surface of the metal layer for increasing the reflectance. Formation of the inner surface of the light guiding part 30 on the resin housing by vapor deposition or plating can achieve a higher productivity and provide improved weight reduction as compared with cases where they are made from a metal material. Furthermore, the difference in the thermal expansion coefficients with the holding part 40 is reduced, which suppresses thermal deformations and results in less fluctuation of sensitivity.

Further, the light guiding part 30 may be formed by cutting machining, and is preferably formed by injection molding in view of the productivity.

<Holding Part>

The holding part 40 is a member for holding the light receiving part 20, the light emitting part 10 and the light guiding part 30. Holding means trying to maintain the relative positional relationship of each member with respect to an external force. The holding form is not particularly limited, but mechanical holding is preferable. The holding form may be electromagnetic or chemical holding.

When the gas detection apparatus of the present embodiment has a controller, the controller may be held by the holding part 40.

The holding part 40 is not particularly limited as long as it can hold the light receiving part 20, the light emitting part 10, and the light guiding part 30. In the present embodiment, the holding part 40 is a resin package, but as the other examples, it may be a printed circuit board or a ceramic package. Alternatively, a semiconductor substrate may be used as the holding part 40, and the light receiving part 20 and the light emitting part 10 may be formed on the same semiconductor substrate. When the holding part 40 is a resin package, it may have a lead frame inside thereof, and the lead frame, the light emitting part 10, the light receiving part 20, and the controller may be electrically connected by a wire or the like. Further, when the holding part 40 is a printed circuit board, the printed circuit board, the light receiving part 20, and the light emitting part 10 may be electrically and mechanically connected by solder. Moreover, the holding part 40 and the light guiding part 30 are mechanically held by an adhesive, screws, claws, fittings, grommets, welding and the like. Further, the holding part 40 may have a connection terminal for making an electrical connection with the outside.

<Controller>

The controller is a member that controls at least one of the light emitting part 10 and the light receiving part 20. The controller may have an analog-to-digital conversion circuit that converts an analog electric signal output from the light receiving part 20 into a digital electric signal. Moreover, the controller may have an operation part that executes a gas concentration calculation based on the converted digital electric signal.

The controller may have at least one of a general-purpose processor that executes a function corresponding to a read-in program and a dedicated processor for a specific process. The dedicated processor may include an Application Specific Integrated Circuit (ASIC). The processor may include a Programmable Logic Device (PLD).

<Size of Gas Detection Apparatus>

Figure 1A:
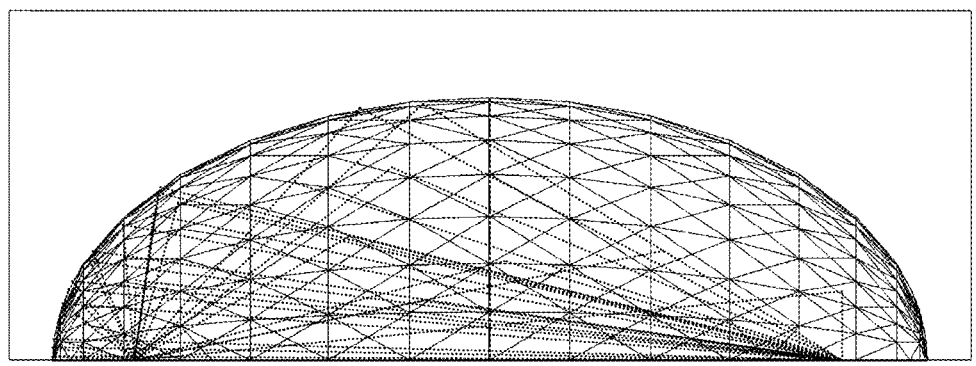
FIG. 1 is a diagram illustrating an example of ray tracing in an ellipsoidal mirror.
Figure 1B:
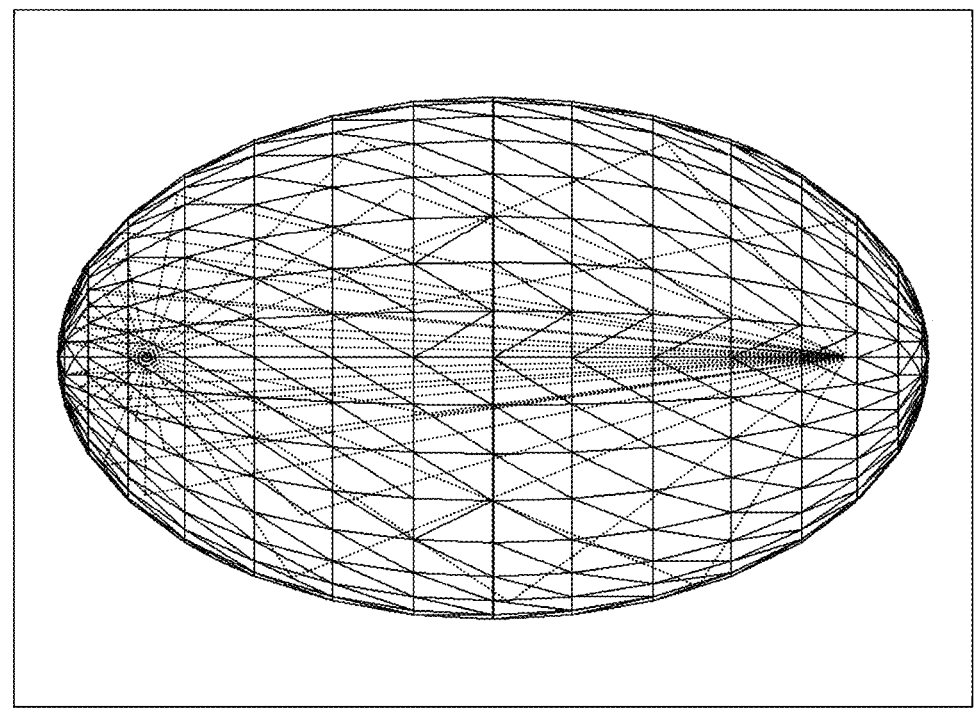
Figure 2A:
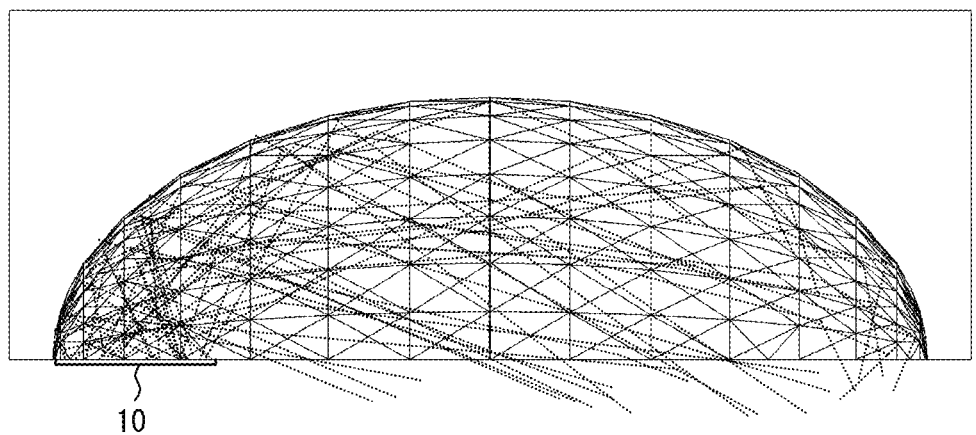
FIG. 2 is a diagram illustrating another example of ray tracing in an ellipsoidal mirror.
Figure 2B:
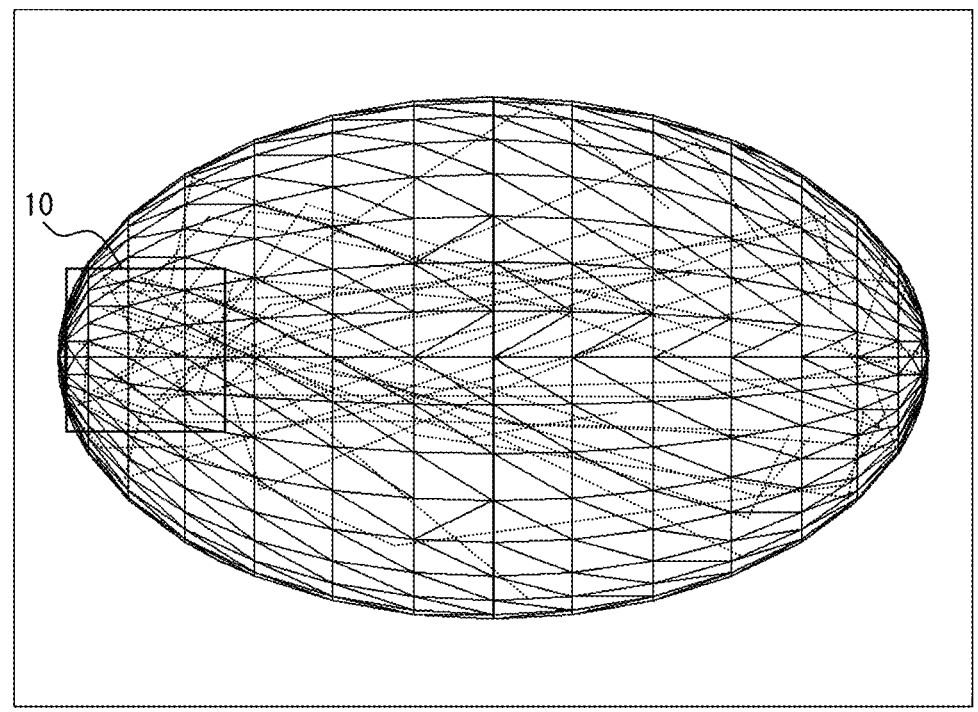

FIGS. 1A and 1B illustrate that when the ellipsoidal mirror is sufficiently large with respect to the size of the light emitting part 10, the light rays emitted from the light emitting part 10 can be collected by the light receiving part 20. Here, as the size of the light guiding part 30, a part of the shape of the light guiding part 30 is configured as an ellipsoid, of which a maximum length of the ellipsoid including the light emitting part 10 is defined as Lms and a maximum length of the light source region is defined as Ls. Here, when the condition of Ls<Lms/50 is satisfied, the size of the light emitting part 10 is sufficiently small with respect to the ellipsoidal mirror, and it can be approximately regarded as a point light source. Thus, the light rays emitted from one focal point position are collected at the other focal point position. On the other hand, as illustrated in FIGS. 2A and 2B, when the ellipsoidal mirror is not sufficiently large with respect to the size of the light emitting part 10 (Ls≥Lms/50), the light rays emitted from the light emitting part 10 are scattered throughout the entire ellipsoidal mirror, and cannot be collected at the light receiving part 20.

Although not particularly limited, the gas detection apparatus of the present embodiment exerts a particularly remarkable effect when Ls≥Lms/50.

Although not particularly limited, similarly, the gas detection apparatus of the present embodiment exerts a particularly remarkable effect when Ld≥Lmd/50, where a maximum length of the ellipsoid including the light receiving part 20 is Lmd and a maximum length of the light receiving part 20 is Ld.

Next, the principle of the gas detection apparatus of the present embodiment will be described in detail with reference to the drawings.

<Explanation of Principle>

Figure 4A:
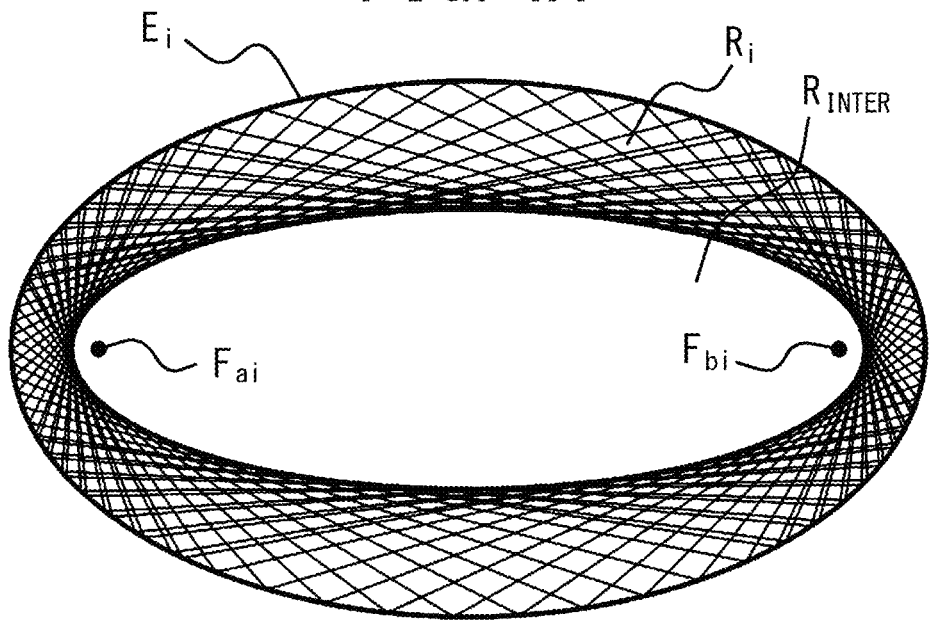
FIG. 4 is a diagram illustrating a ray tracing simulation result in a spheroidal mirror.
Figure 4B:
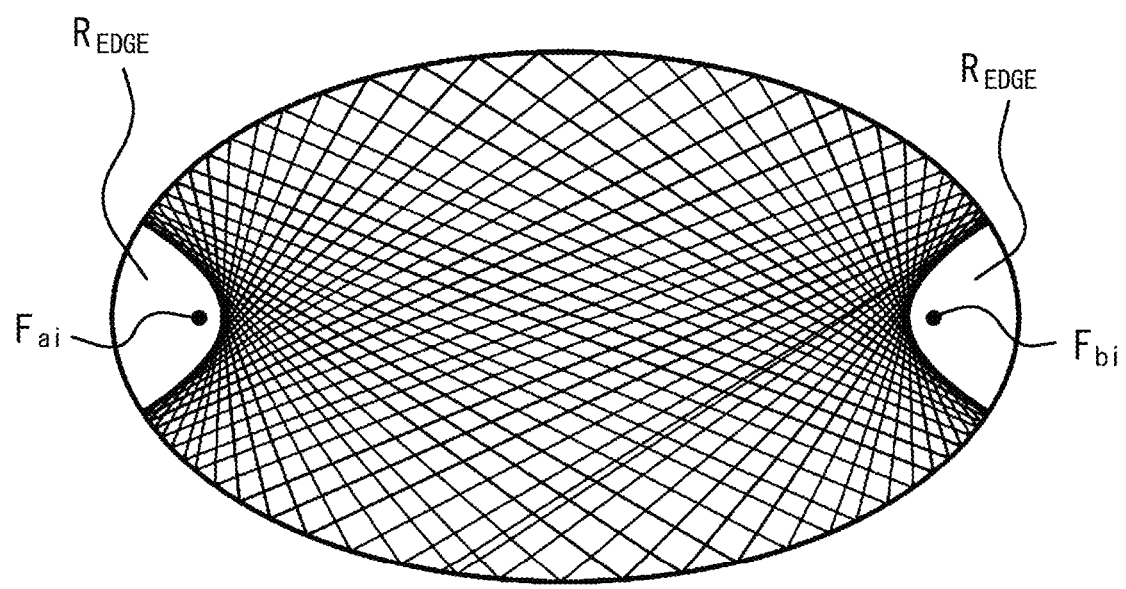

FIG. 4 is a diagram for explaining the basic principle of the present embodiment, and is a ray tracing simulation result in a plane passing through the rotation axis of a spheroidal mirror. As described above, the gas detection apparatus may also be composed of a plurality of spheroids, but one spheroid will be used for explaining the basic principle. When n (n: one or more natural numbers) ellipsoids constituting the gas detection apparatus are defined as ellipsoids $E_1, \ldots, E_i, \ldots,$ and $E_n$ (i: a natural number satisfying 1≤i≤n), the spheroid in each of FIGS. 4A, 4B and 5 corresponds to one ellipsoid $E_i$ (i=n=1).

FIG. 4A illustrates a light ray simulation result when light rays are emitted from a point of the region $R_i$, which is a region outside the focal points $F_{ai}$ and $F_{bi}$ of the spheroid. At this time, the light rays are repeatedly reflected on the mirror surface. However, the light rays do not enter the region $R_{INTER}$, which is a region that connects between focal points near the center of ellipsoid.

Further, FIG. 4B is a light ray simulation result when the light rays are emitted from the point of the region $R_{INTER}$. The light rays do not enter the region $R_{EDGE}$, which is the region at both ends outside the focal points $F_{ai}$ and $F_{bi}$ of the spheroid.

The separation phenomenon of the light ray penetration region in this region $R_i$ and the region $R_{INTER}$ (hereinafter referred to as a region separation phenomenon) is explained by equating the light ray trajectory with the trajectory of a rigid sphere that repeatedly and elastically collides with a wall having the same shape as that of the mirror surface. The general angular momentum $J = L_{Fai} \cdot L_{Fbi}$, which is an inner product of the angular momentum $L_{Fai}$ centered on the focal point $F_{ai}$ and the angular momentum $L_{Fbi}$ centered on the focal point $F_{bi}$ is conserved, with respect to the movement of a rigid sphere that elastically reflects on an ellipsoidal wall in free space. At this time, since the rotation directions viewed from each focal point are the same in the trajectory of the rigid sphere emitted from the point in the region $R_i$, the angular momentums $L_{Fai}$ and $L_{Fbi}$ are in the same direction, and the general angular momentum J is positive (J>0). On the other hand, when the trajectory passes through the region $R_{INTER}$, since the rotation directions viewed from each focal point are opposite, the general angular momentum J is negative (J<0).

That is, according to the conservation law of general angular momentum J, a trajectory (light ray) of a rigid sphere emitted first from the region $R_i$ has a positive value of general angular momentum J, and it cannot be a trajectory (light ray) of a rigid sphere passing through the region $R_{INTER}$ with the general angular momentum of a negative value, no matter how many times the trajectory is reflected by the wall on the mirror. On the contrary, a trajectory (light ray) of a rigid sphere emitted from the region $R_{INTER}$ with the general angular momentum of a negative value cannot be a trajectory (light ray) of a rigid sphere passing through the region $R_i$ with the general angular momentum of a positive value, no matter how many times the trajectory is reflected by the wall on the mirror. In this manner, the region separation phenomenon occurs. Here, when the general angular momentum J is 0, it corresponds to a trajectory emitted from one focal point and reaches the other focal point, whereby the phase space of the rigid sphere motion is separated.

Here, when an ellipse having a maximum area in the cross section of the ellipsoid $E_i$ (i: a natural number satisfying 1≤i≤n) is defined as an ellipse $E_{ci}$, the focal point is uniquely determined if it is a spheroid, and the maximum area is a cross section passing through two focal points. Further, when an ellipsoid that passes through the two focal points $F_{ai}$ and $F_{bi}$ of the ellipsoid $E_{ci}$ and has a minimum volume having a scaling relationship with the ellipsoid $E_i$ without being rotated is defined as an ellipsoid $E_{si}$, the focal point is uniquely determined if it is a spheroid. Thus, the above described principle generally holds "when an ellipsoid having a maximum area in the cross section of the ellipsoid $E_i$ (i: a natural number satisfying $1 \leq i \leq n$) is defined as an ellipsoid $E_{ci}$ and an ellipsoid that passes through the two focal points $F_{ai}$ and $F_{bi}$ of the ellipsoid $E_{ci}$ and has a minimum volume having a scaling relationship with the ellipsoid $E_i$ without being rotated is defined as an ellipsoid $E_{si}$."

Next, the configuration of the gas detection apparatus of the present embodiment based on the above-described separation phenomenon of the light ray penetrating region will be described.

Figure 5:
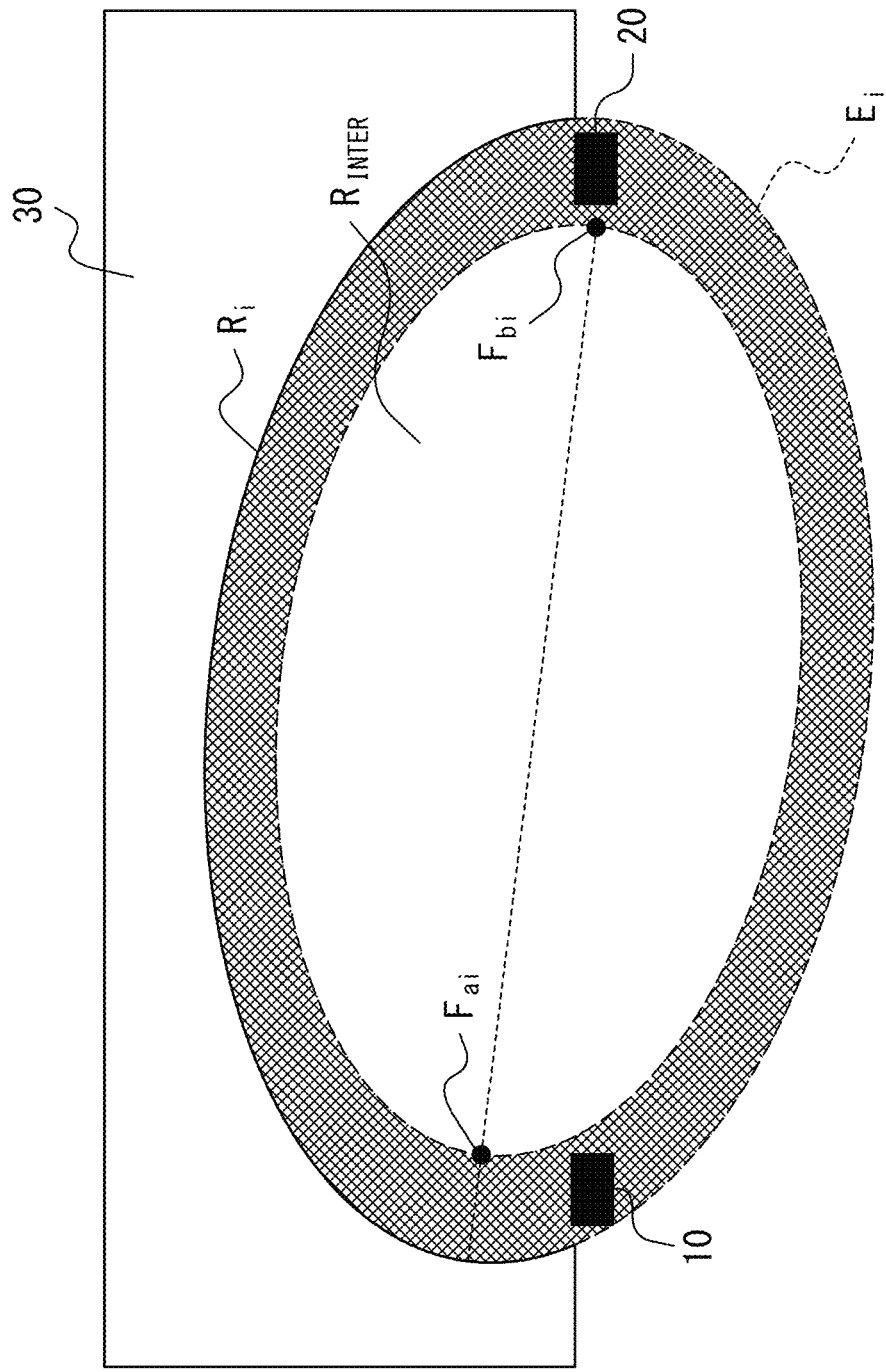
FIG. 5 is a diagram for explaining a region $R_i$.

FIG. 5 is a diagram for explaining the present embodiment that applies the region separation phenomenon to the inner surface of the light guiding part 30 that includes one spheroidal shape. Due to the region separation phenomenon, when at least a part of the light source region is disposed in the region $R_i$, the light rays emitted from the light source at this position are always present in the region $R_i$ even if they are repeatedly reflected by the mirror. At this time, when the light receiving region is also disposed in the region $R_i$, the light rays stay in the region $R_i$ without scattering over the region $R_{INTER}$, and thus light can be collected efficiently with respect to the light receiving region.

In this manner, the gas sensitivity of the detection apparatus can be improved. Even in the case where the light source region and the light receiving region are present partially in the region $R_i$ the effect of the present embodiment is exhibited in the partial region. Therefore, the effect is realized when 60% or more of the light source region is present in the region $R_i$. Further, in the complementary same expression, the effect is realized when less than 40% of the light source region and the light receiving region are present in the region $R_{INTER}$. From the viewpoint of improving gas sensitivity, preferably, 70% or more of the light source region is present in the region more preferably, 80% or more of the light source region is present in the region $R_i$, and preferably, the entire light source region is present in the region $R_i$. Similarly, from the viewpoint of improving gas sensitivity, preferably, 70% or more of the light receiving region is present in the region $R_i$, more preferably, 80% or more of the light receiving region is present in the region $R_i$, and preferably, the entire light receiving region is present in the region $R_i$.

That is, when an ellipsoid in which at least a part of the shape of the inner surface of the light guiding part 30 passes through the two focal points $F_{ai}$ and $F_{bi}$ of the ellipsoid $E_i$, and that has the same axis of rotational symmetry as that of the ellipsoid $E_i$ and a similarity shrinking relationship with the ellipsoid Ei is defined as an ellipsoid $E_{si}$, if 60% or more of the areas of the light source region of the light emitting part 10 and the light receiving region of the light receiving part 20 are present in the region $R_i$, which is a region inside the ellipsoid $E_i$ and not including the ellipsoid $E_{si}$, a compact and highly accurate gas detection apparatus using an ellipsoidal mirror is realized. This effect is noticeable when the two focal points of the spheroid are sufficiently separated and the region $R_{INTER}$ is formed. Specifically, this effect is remarkably exhibited when the ratio of the semi-minor axis b and the semi-major axis a of the spheroid, "a/b," is 1.2 or more. "b" is the shortest semi-minor axis b.

Here, although it has been described that 60% or more of the light source region is present in the region $R_{in}$ and 60% or more of the light receiving region is present in the region $R_{out}$, focusing on the center of gravity or the peak point of luminance, the following holds. That is, assuming that the center of gravity of the light source region or the peak point of luminance is a point $G_{in}$ and the center of gravity of the light receiving region is a point $G_{out}$, the point $G_{in}$ is present in the region $R_{in}$ and the point $G_{out}$ is present in the region $R_{out}$.

<Arrangement in a Plurality of Ellipsoids>

Although an embodiment in which one spheroidal mirror (i=1) is used has been described above, the gas detection apparatus of the present embodiment exhibits the same effect even if it comprises the light guiding part 30 having a plurality of spheroidal mirrors.

FIG. 6 illustrates a gas detection apparatus according to the present embodiment that uses three light guiding parts 30 each having a spheroidal inner surface (reflective surface). FIG. 6A is a schematic diagram and FIG. 6B is a light ray tracing simulation result. The three light guiding parts 30 are composed of three ellipses and may be one connected member as a whole.

In FIG. 6A, the region $R_1$ with respect to the ellipsoid $E_1$ containing the light source region of the spheroid is defined as a region $R_{in}$. A neighboring ellipsoid $E_2$ includes a region $R_2$. When the light source region is located in the region $R_{in}$, the light rays are brought, without scattering, into the region $R_{in}$ on the other end side of the ellipsoid $E_{s1}$. When the region into which the light rays are brought is regarded again as a light source of the ellipsoid $E_2$, the light rays can move in the region $R_2$ without scattering. In order to realize this efficiently, it is preferable that, for reflecting the light rays, auxiliary reflectors 50 as illustrated in FIGS. 6A and 6B are further provided as light guiding parts 30 for the neighboring spheroid. Although the form of the auxiliary reflector 50 is not particularly limited, examples thereof include a flat mirror, a concave mirror, a convex mirror, etc. The auxiliary reflector 50 may be formed of a figure different from that of the spheroid. From the viewpoint of simplicity and efficiency, the auxiliary reflector 50 is preferably a flat mirror. Further, the auxiliary reflector 50 may have a wavelength selecting function. The auxiliary reflector 50 may preferably be disposed in the region $R_i$ of a spheroid.

By repeating the above sequentially, the light rays can move without scattering as illustrated in the light ray tracing simulation result of FIG. 6B. Finally, when the light receiving region is disposed at last in the region $R_{out}$, which is the region $R_3$ of the ellipsoid $E_3$, light can be collected efficiently in the same manner as in the case where one spheroidal mirror is used.

That is, when 60% or more of the area of the light source region of the light emitting part 10 is present in the region $R_{in}$ and 60% or more of the area of the light receiving region of the light receiving part 20 is present in the region $R_{out}$, a compact and highly accurate gas detection apparatus using an ellipsoidal mirror can be realized. It is possible to design an optical path length longer than in the case of one spheroidal mirror, which may be preferable from the viewpoint of detection accuracy.

FIG. 7 is a variation where two spheroids are used. The light guiding part 30 is composed of a mirror in which two spheroids are combined and a plane mirror, and the long axes of the two spheroids intersect at right angles. At this time, when the auxiliary reflector 50 is provided in the region as with the case of FIG. 6, a compact and highly accurate gas detection apparatus using an ellipsoidal mirror can be realized.

Figure 8:
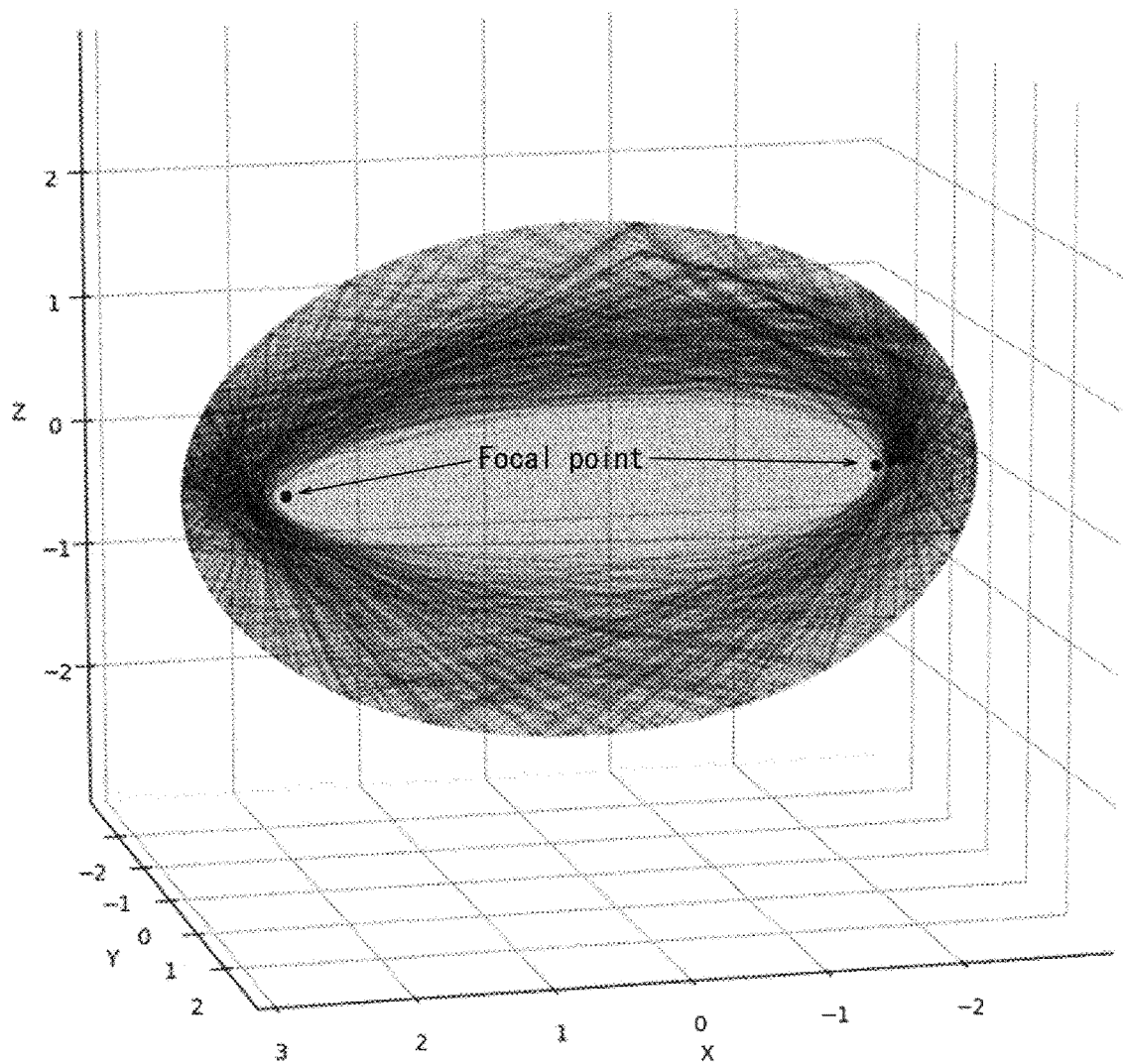
FIG. 8 is a diagram illustrating a ray simulation result of a general ellipsoid.

As described above, although the light guiding part 30 has been described as a spheroid, it may be a general ellipse, that is, one having no rotational symmetry and having three different diameters. Since a rigid sphere system that elastically reflects inside a general ellipsoidal wall (so-called a billiard problem) is also an integrable system, there is a conserved quantity similar to the general angular momentum J, and a similar region separation phenomenon follows. FIG. 8 illustrates a light ray simulation result when the light rays are emitted from the point of the region which is a region outside the focal points $F_{ai}$ and $F_{bi}$ of a general ellipsoid. The focal points $F_{ai}$ and $F_{bi}$ illustrated in FIG. 8 are focal points on a plane ellipse that has a maximum area when the ellipsoid is cut in a plane, and the light rays emitted from the region $R_i$ outside thereof continue to stay in the region $R_i$ even if repeatedly reflected. This is also understood from the fact that when the smallest one of the ellipse diameters becomes ultimately zero, it will be the same as the region separation phenomenon due to the focal point in a plane ellipse, and a general ellipse case is positioned between the spheroid case described above and this plane ellipse case.

Although the embodiments have been described with reference to the drawings and the examples, it should be noted that various modifications and variations can be readily conceived of by a person skilled in the art based on the present disclosure. Therefore, it should be understood that such modifications and variations are encompassed within the scope of the present disclosure. For example, the members, the functions included in each means, or the like can be rearranged unless they are logically contradicted, and a plurality of means, and the like can be combined into one or means can be divided, for example.

Figure 9:
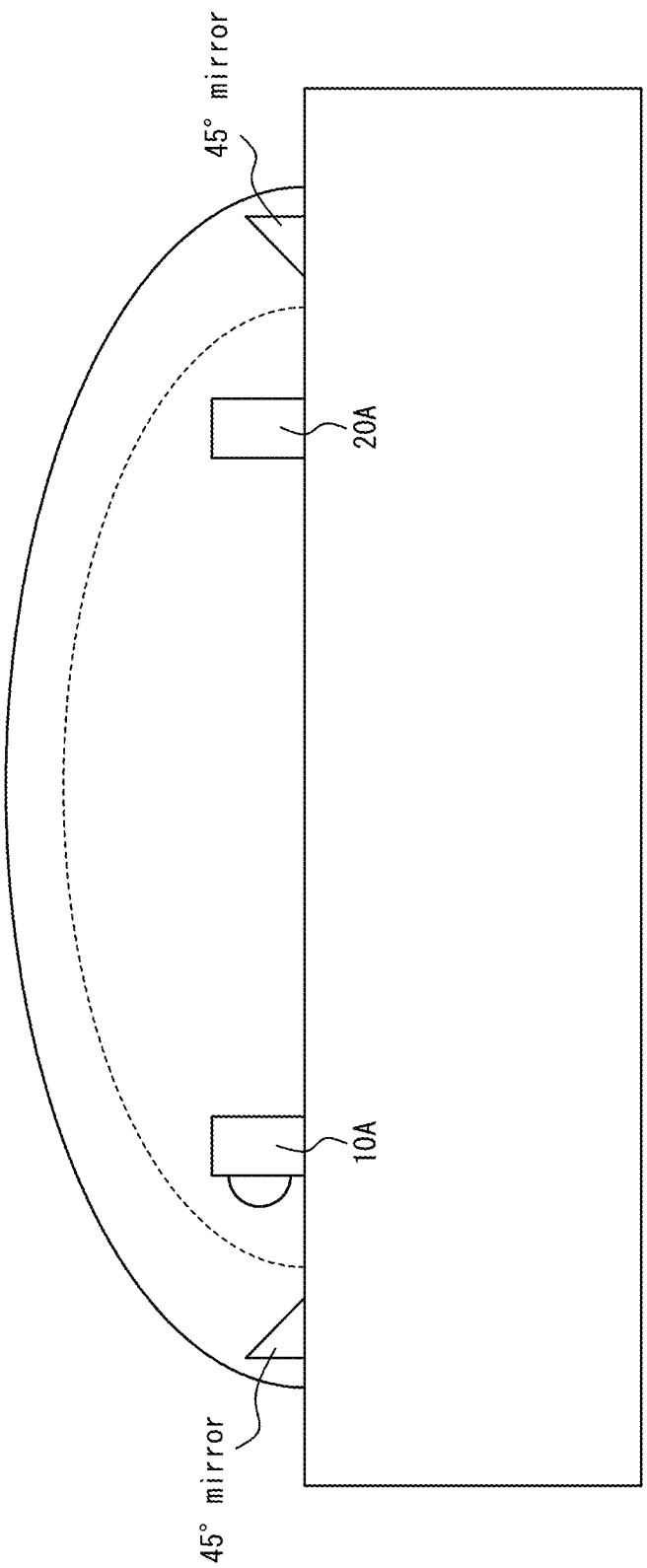
FIG. 9 is a diagram illustrating a configuration example of a light emitting part including a passive element and a light receiving part including an indirect element.
Figure 10:
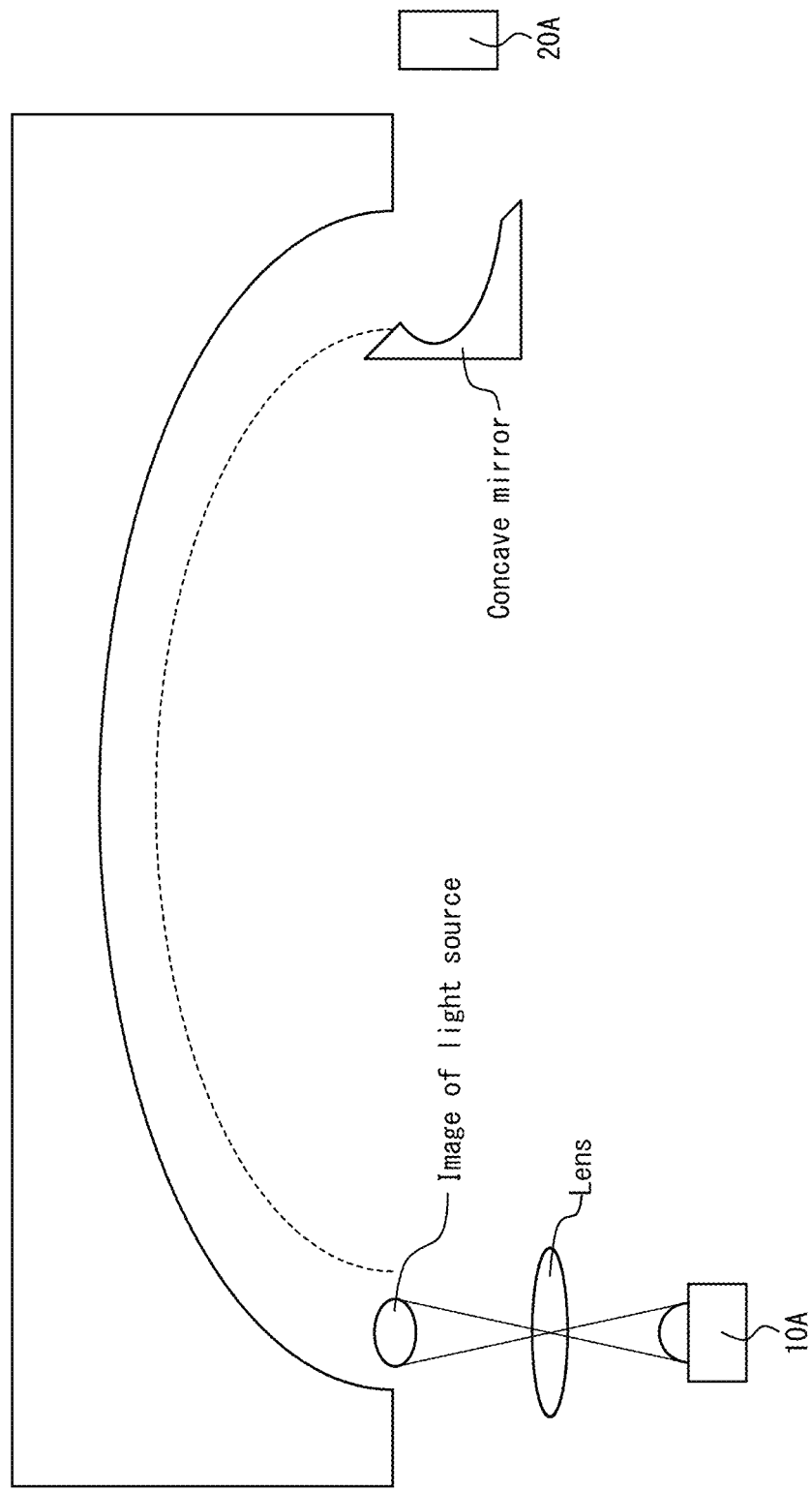
FIG. 10 is a diagram illustrating another configuration example of a light emitting part including a passive element and a light receiving part including an indirect element.

FIGS. 9 and 10 illustrate configuration examples of the light emitting part 10 including a passive element and a light receiving part 20 including an indirect element according to another embodiment. In the example illustrated in FIG. 9, the light emitting part 10 includes a light emitting element 10A and a passive element, which is a 45° mirror. Further, in the example illustrated in FIG. 9, the light receiving part 20 includes a light receiving element 20A and an indirect element, which is a 45° mirror. In the example illustrated in FIG. 10, the light emitting part 10 includes the light emitting element 10A and a passive element, which is a lens. Further, in the example illustrated in FIG. 10, the light receiving part 20 includes a light receiving element 20A and an indirect element, which is a concave mirror.

(Appendant)

A gas detection apparatus according to an embodiment comprises:
   a light emitting part; a light receiving part; and a light guiding part for guiding light from the light emitting part to the light receiving part, wherein
   a shape of at least a part of an inner surface of the light guiding part is composed of all or a part of figures of n (n: one or more natural numbers) spheroids; and when:
   the n spheroids are defined as ellipsoids $E_i$, $E_2$, . . . , $E_{(n-1)}$ and $E_n$;
   an ellipse that passes through two focal points $F_{ai}$ and $F_{bi}$ of an ellipsoid $E_i$ (i: a natural number satisfying 1≤i≤n), has the same axis of rotational symmetry as that of the ellipsoid $E_i$, and has a similarity shrinking relationship with the ellipsoid $E_i$ is defined as an ellipsoid $E_{si}$;
   a region inside the ellipsoid $E_i$ and not including the ellipsoid $E_{si}$ is defined as a region $R_i$;
   the ellipsoid $E_i$ including a light emitting surface of the light emitting part is defined as an ellipsoid $E_s$;
   the ellipsoid $E_i$ including a light receiving surface of the light receiving part is defined as an ellipsoid $E_d$;
   the region $R_i$ of the ellipsoid $E_s$ is defined as a region $R_{in}$, and
   the region $R_i$ of the ellipsoid $E_d$ is defined as a region $R_{out}$,
   60% or more of an area of the light emitting surface may be present in the region $R_{in}$ and 60% or more of an area of the light receiving surface may be present in the region $R_{out}$.

The invention claimed is:

1. A gas detection apparatus comprising:
   a light emitting part;
   a light receiving part; and
   a light guiding part for guiding light from the light emitting part to the light receiving part, wherein
   a shape of at least a part of an inner surface of the light guiding part is composed of all or a part of n (n: one or more natural numbers) ellipsoids, and when:
   then ellipsoids are defined as ellipsoids $E_1$, $E_2$, . . . , $E_{(n-1)}$ and $E_n$;
   an ellipse having a maximum area in a cross-section of an ellipsoid $E_i$ (i: a natural number satisfying 1≤i≤n) is defined as an ellipse $Ec_i$;
   an ellipsoid that passes through two focal points $F_{ai}$ and $F_{bi}$ of the ellipse $Ec_i$ and has a minimum volume having a scaling relationship with the ellipsoid $E_i$ without being rotated is defined as an ellipsoid $E_{si}$;
   a region inside the ellipsoid $E_i$ and not including the ellipsoid $E_{si}$ is defined as a region $R_i$;
   the ellipsoid $E_i$ including a light source region of the light emitting part is defined as an ellipsoid $E_s$;
   the ellipsoid $E_i$ including a light receiving region of the light receiving part is defined as an ellipsoid $E_d$;
   the region $R_i$ of the ellipsoid $E_s$ is defined as a region $R_{in}$; and
   the region $R_i$ of the ellipsoid $E_d$ is defined as a region $R_{out}$;
   60% or more of the light source region is present in the region $R_{in}$ and 60% or more of the light receiving region is present in the region $R_{out}$,
   wherein the inner surface of the light guiding part is reflective; wherein, when a maximum length of the light source region is defined as $L_s$ and a maximum length of the ellipsoid $E_s$ is defined as $L_{ms}$, $L_s \geq L_{ms}/50$; and wherein, when a maximum length of the light receiving part is defined as $L_d$ and a maximum length of the ellipsoid $E_d$ is defined as $L_{md}$, $L_d \geq L_{md}/50$.

2. The gas detection apparatus according to claim 1, wherein a ratio a/b of a semi-major axis a and a semi-minor axis b of each of the ellipsoid $E_s$ and the ellipsoid $E_d$ is 1.2 or more.

3. The gas detection apparatus according to claim 1, wherein an identical holding part holds the light emitting part and the light receiving part.

4. The gas detection apparatus according to claim 3, wherein the identical holding part further holds a controller.

5. The gas detection apparatus according to claim 1, wherein at least one of the light receiving part and the light emitting part has an optical filter.

6. The gas detection apparatus according to claim 1, further comprising an auxiliary reflector composed of a figure different from the n ellipsoids.

7. The gas detection apparatus according to claim 6, wherein the auxiliary reflector is present in the region $R_i$.

8. The gas detection apparatus according to claim 1, wherein the light emitting part is a plane light source.

9. The gas detection apparatus according to claim 1, wherein the n ellipsoids are spheroids.

* * * * *

UNITED STATES PATENT AND TRADEMARK OFFICE
CERTIFICATE OF CORRECTION

| | | |
|---|---|---|
| PATENT NO. | : 11,921,030 B2 | Page 1 of 1 |
| APPLICATION NO. | : 17/452617 | |
| DATED | : March 5, 2024 | |
| INVENTOR(S) | : Takaaki Furuya et al. | |

It is certified that error appears in the above-identified patent and that said Letters Patent is hereby corrected as shown below:

On the Title Page

Please insert the following information as item (73) (Assignee):
--Asahi Kasei Microdevices Corporation, Tokyo (JP)--

Signed and Sealed this
Twenty-third Day of April, 2024

*Katherine Kelly Vidal*
Katherine Kelly Vidal
*Director of the United States Patent and Trademark Office*